(12) United States Patent
Lyons

(10) Patent No.: US 9,269,079 B2
(45) Date of Patent: Feb. 23, 2016

(54) SOCIAL NETWORK STEALTH AND COUNTER MESSAGING

(75) Inventor: Sean M. Lyons, Santa Ana, CA (US)

(73) Assignee: GENZET, Santa Ana, CA (US)

( * ) Notice: Subject to any disclaimer, the term of this patent is extended or adjusted under 35 U.S.C. 154(b) by 568 days.

(21) Appl. No.: 13/245,606

(22) Filed: Sep. 26, 2011

(65) Prior Publication Data

US 2013/0080544 A1    Mar. 28, 2013

(51) Int. Cl.
| | |
|---|---|
| G06F 15/16 | (2006.01) |
| G06Q 10/10 | (2012.01) |
| H04L 29/06 | (2006.01) |
| H04L 29/08 | (2006.01) |
| G06Q 50/00 | (2012.01) |

(52) U.S. Cl.
CPC ............. *G06Q 10/107* (2013.01); *G06Q 50/01* (2013.01); *H04L 29/06* (2013.01); *H04L 29/08072* (2013.01)

(58) Field of Classification Search
CPC .......................... H04L 29/08072; H04L 29/06
USPC ........................ 709/204, 206, 220, 225; 726/4
See application file for complete search history.

(56) References Cited

U.S. PATENT DOCUMENTS

| | | | |
|---|---|---|---|
| 7,668,957 B2 | 2/2010 | Achlioptas et al. | |
| 8,296,380 B1 * | 10/2012 | Kelly et al. | 709/206 |
| 8,631,473 B2 * | 1/2014 | Bhatia et al. | 726/4 |
| 8,635,674 B2 * | 1/2014 | Bhatia et al. | 726/4 |
| 8,667,579 B2 * | 3/2014 | Leeder | H04W 12/06 713/185 |
| 2010/0114788 A1 | 5/2010 | White et al. | |
| 2010/0318925 A1 | 12/2010 | Sethi et al. | |
| 2011/0197146 A1 | 8/2011 | Goto et al. | |
| 2012/0278127 A1 * | 11/2012 | Kirakosyan et al. | 705/7.29 |
| 2013/0132861 A1 * | 5/2013 | Kienzle | G06Q 10/10 715/753 |
| 2013/0173712 A1 * | 7/2013 | Monjas Llorente et al. | 709/204 |
| 2015/0127439 A1 * | 5/2015 | Campos De Figueiredo Faceira | G06Q 30/0222 705/14.16 |

* cited by examiner

*Primary Examiner* — Khanh Dinh

(57) ABSTRACT

Stealth and counter messaging, in some embodiments in the context of social networking sites, is disclosed. A first user may provide a first, counter-message along with a second, stealth message. When posting the first message, its corresponding identifier as set by the social networking site is recorded in a linked relationship to the second message. When an authorized second user retrieves the first message from the social networking site, its identifier is queried to determine whether there is a corresponding second message. After locating the identifier for the first message, the associated second message is retrieved and transmitted to the second user.

26 Claims, 11 Drawing Sheets

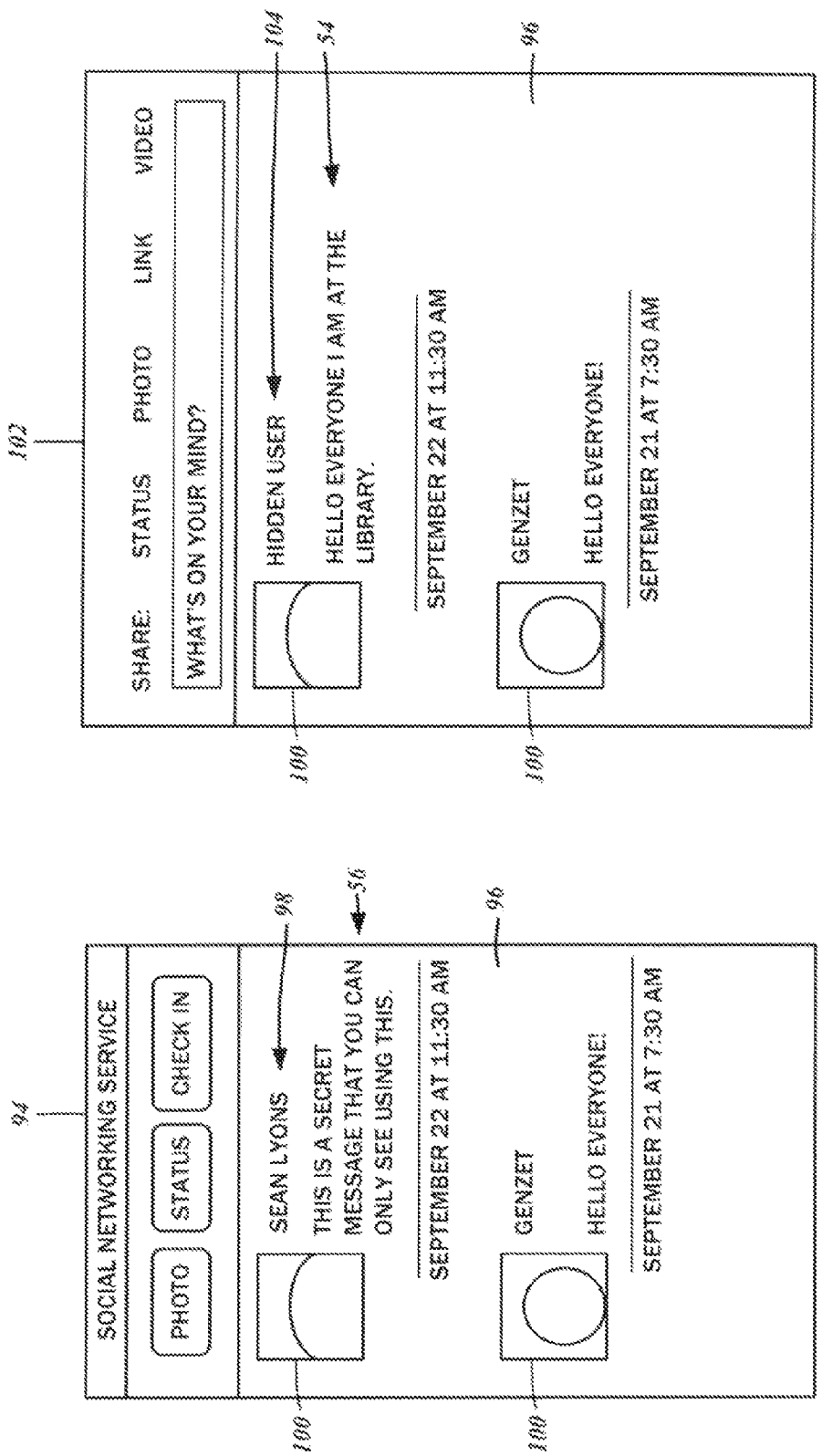

SOCIAL NETWORK STEALTH AND COUNTER MESSAGING

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to electronic communications and social networking systems. More particularly, the present disclosure relates to social network stealth and counter messaging.

2. Related Art

As a communications tool, the Internet has grown well beyond its research and scientific roots, and is now ubiquitous throughout all aspects of daily work and personal lives. Much of business and communications pertaining thereto are conducted electronically over e-mail, instant messaging systems, and teleconferencing systems that all utilize the data transfer capabilities of the Internet. Documents and other media necessary for business are also stored and exchanged electronically. Furthermore, various automated transactions such as the purchase of goods, banking, and even government-related filings may be completed over web-based applications and websites that are accessible remotely from any location at any time.

Along with the increasing use of the Internet for such business and commercial purposes, so is the use for entertainment and social purposes. Currently, one of the most popular sites accessed online are social networking services, in which users establish connections with other users to share information.

There are numerous social networking sites that are currently in operation, and each generally provides a slightly different user experience that caters to different needs and uses than the others. Some of these differences are by design and inherent to the features of the social networking site, while other differences may simply stem from the perceived environment to which the users conform their activities. For example, services such as Facebook (www.facebook.com), MySpace (www.myspace.com), and Google+ (plus.google.com) may take on a more leisurely atmosphere, while a service such as LinkedIn (www.linkedin.com) is more work-oriented, where the focus is more on the professional accomplishments and business relationships of the users. A service such as Twitter (www.twitter.com) may be suitable for broadcasting short, limited length messages to the users' network of "followers," and a service such as Flickr (www.flickr.com) may be limited on the sharing of photographs.

In most cases, the connections or networks that the users establish mirror those of the participants' real-life friendships and associations. However, relationships may also be formed solely online based upon common interests or activities, particularly where the participants are located in disparate geographic areas. Because of the varying uses, one person may have accounts on more than one of the aforementioned social networking sites and others, and information shared on one site may be cross-shared on another site.

The primary feature that is common amongst most social network sites is the user profile. Users establish an account with the social networking site by providing a name and other identifying information, and before any action may be taken in connection with the user profile, the user logs in to the account by supplying an account identifier and a password. The profile may include biographic data such as birthday, gender, current location, schools attended, employment experiences, and personal relationships for searching and viewing by other users. Further information that may provide an even more detailed picture of the profile owner and his personality may be added, such as religious affiliation, personal philosophies, tastes in music, literature, cinema, television, athletic teams, and so on.

Links to other users or contacts may be formally established and publicized on a user's profile as well, which may then permit direct communications via e-mail like messages between the user and the contacts. In some systems, real-time chat with concurrently online contacts may also be possible. Access to the profile information may be restricted based upon the level of affiliation to its owner. For example, contacts having a direct "friendship" link to a given user may be able to view the complete profile information thereof, while those having only a secondary affiliation (friend of a friend) may be able to view only the basic biographic information. The establishment of a friendship "network" is understood to facilitate new users to the social network to establish their own direct links to common friends.

Specific user-to-user communications is a significant aspect of most social networking services, but another feature which perhaps eclipses this is the broadcasting of information to everyone within the user's circle of contacts. Specific names and implementations may vary, with some social networking services referring to this feature as a "wall," while others refer to this feature as "comments," "tweets," or others. Regardless of the terminology employed, the feature is essentially the same—a variety of content can be posted by the profile owner or by the profile owner's contacts for viewing by those within the user's network of friends. This content may include text messages, Uniform Resource Locator (URLS) including links to other webpages, photographs, and videos. With the proliferation of GPS (Global Positioning Satellite)-enabled mobile devices with Internet access capabilities, location coordinate data may also be posted. There may be enhancements to the display of the foregoing data, such as showing the location on a map overlaid on the rendered page, or a preview of the webpage for a link.

Oftentimes personal and social lives are kept sharply segregated from work or professional lives. Conduct or activities that may be acceptable within a person's social circles may be deemed completely inappropriate or undesirable within that person's professional circles. It is the rare individual who can seamlessly blend social and professional identities without the risk of repercussions. For example, a person's drinking exploits or frequenting of establishments of questionable repute may be entertaining for friends, but may not be well taken by employers, supervisors, co-workers, and clients.

With social networking services permitting, and indeed encouraging users to post and share all kinds of information, including that which may not be the most professionally advisable, many an unwary social networking user has been unable to exercise discretion and restraint, shared too much, and suffered the consequences. As a result, there have been many instances of imprudent posts that led to dismissals from employment and irreparable reputational damage amongst colleagues. Along these lines, before extending an offer of employment, employers now frequently search social networking sites for obvious red flags and problematic posts that may render a candidate unsuitable. Even within social circles, publicizing certain information may lead to broken friendships and broken romantic relationships.

Earlier implementations of social networking sites did not provide the user with much control over what information was shared with which contacts. Improvements in privacy settings and independent restriction control for each piece of content posted or otherwise associated with the profile has reduced the likelihood of inadvertent disclosure to certain undesired contacts. Still other social networking sites such as Google+ have been built around the concept of grouping contacts into subsets, referred to as "circles," with the user having the power to designate which content is visible to which of the "circles."

Notwithstanding these additional privacy measures, it may be desirable to post some content, as these "on or off" content access limits may result in some contacts not seeing any information at all. There is a delicate balance to be maintained between the sharing and restricting of posts to avoid offending those contacts with which the user would rather not share much of his personal life, but with which the user would nevertheless like to maintain connections for various reasons. Accordingly, there is a need in the art for an improved social network stealth and counter messaging.

BRIEF SUMMARY

The present disclosure contemplates various methods and systems for stealth and counter messaging on a social networking site, an Internet message board, or other interactive communications services. One embodiment contemplates a method for transforming messages that are posted by users, and may include a step of receiving from an originating client a first message and a second message associated therewith. This step may also involve receiving a first access token specific to a first user of the social networking service site that is associated with the originating client. Thereafter, the method may continue with transmitting a message post command to the social networking service site. The message post command may include the first message and the first access token. Additionally, there may be a step of receiving from the social networking service site a first message identifier corresponding to the first message. The first message identifier may be generated in response to the message post command and a validation of the first access token. There may further be a step of storing the second message and the first message identifier in a linked relationship for retrieval based upon a query for the first message identifier. The method may include a step of transmitting a confirmation message to the originating client in response to receiving the first message identifier.

There is also contemplated an alternative method for transforming messages that are posted by users. This method may include receiving from an originating client a message post request including a first message posted to the social networking service site, a first message identifier corresponding to the first message, and a second message associated with the first message. Thereafter, the method may include the step of storing the message identifier in a linked relationship to the second message. There may also be a step of transmitting a confirmation message to the originating client following the storing of the message identifier. The first message identifier may be generated by the social networking service site in response to a message post command from the originating client including a first access token that is specific to a first user of the social networking service site associated with the originating client.

Another embodiment contemplates a method for transforming the messages specifically involving the retrieval thereof. Following the second message and the first message identifier being stored in either of the ways mentioned above, or by any other way, the method continues with receiving from a requesting client a message retrieval request and a second access token specific to a second user of the social networking service site associated with the requesting client. The method may also include transmitting to the social networking service site a message retrieval command and the second access token in response to the message retrieval request from the requesting client. There may also be a step of receiving at least one message identifier from the social networking service site. The at least one message identifier may be the first message identifier, and may also correspond to the first message stored in the content repository of the first profile.

An alternative method for transforming the messages involving its retrieval is also disclosed. This method may include receiving from a requesting client at least one message identifier corresponding to a message designated for access by a second user of the social networking service site. The second user may be associated with the requesting client. The at least one message identifier may be the first message identifier that corresponds to the first message stored in the content repository of the first profile. The method may further include querying for the second message with the at least one message identifier. There may also be a step of transmitting the second message to the requesting client.

According to another embodiment, there is disclosed a system for transforming messages from a first user to a second user on an interactive communications site. There may be a database including a first message field, a second message field, and a first message identifier field. Further, there may be a database query interface that is connected to the database. Data in the second message field may be retrieved in response to a query on the corresponding first message identifier field. The system may also include a messaging interface that interconnects the database query interface to an external message data source. The data source may have a first message and a second message originating from the first user and assigned a first message identifier. The first message, the second message, and the first message identifier may be stored in the respective first message field, the second message field, and the first message identifier of the database in response to a message store request from the external message data source. Additionally, the system may include a client interface that interconnects the database query interface to a client system that is associated with the second user. The second message may be transmitted from the database to the client system in response to a message retrieval request from the client system to the database query interface. The message retrieval request may include a specific value of the first message identifier.

The various aspects of the invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 11 is a screenshot of the social networking site user interface and its content repository as displayed to a privileged user including the second message; and FIG. 12 is a screenshot of a social networking site user interface and its content repository as displayed to a general, unprivileged user including the first message.

Common reference numerals are used throughout the drawings and the detailed description to indicate the same elements.

DETAILED DESCRIPTION

The detailed description set forth below in connection with the appended drawings is intended as a description of the presently contemplated embodiments of the methods and systems for social network stealth and counter messaging and is not intended to represent the only form in which the disclosed invention may be developed or utilized. The description sets forth the various functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
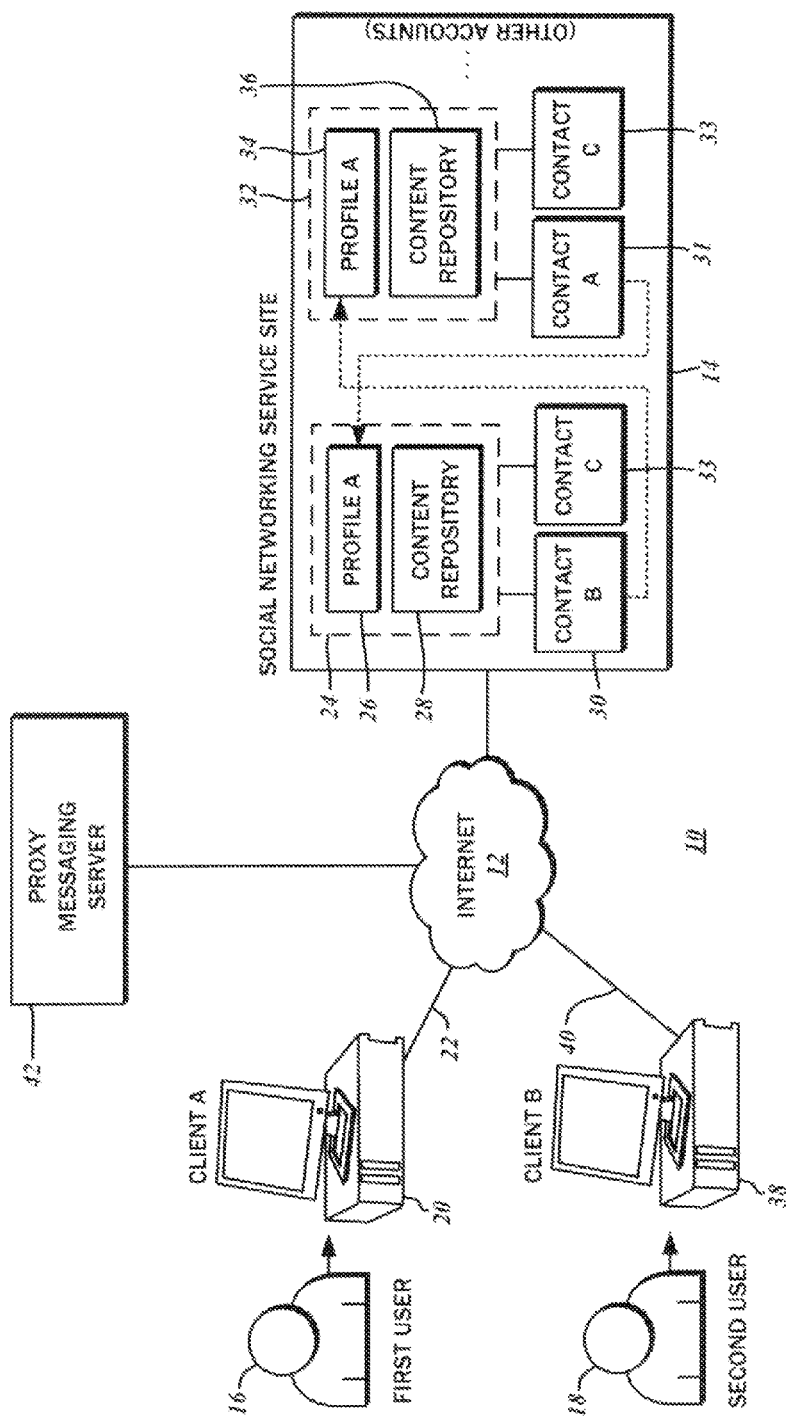
FIG. 1 is a block diagram of one exemplary environment in which various embodiments of the presently disclosed social network stealth and counter messaging may be implemented.

The block diagram of FIG. 1 illustrates an exemplary networked computing environment 10 over the Internet 12. Various embodiments of social network stealth and counter messaging may be implemented in the context of the networked computing environment 10, which includes a social networking service site 14 or other interactive communications sites. There are numerous variations of the social networking service site 14 currently online and accessible over the Internet 12 including Facebook, Google+ Twitter, MySpace, LinkedIn, and many others that are popular across a wide user base. Recently, many other types of online services such as e-commerce storefronts, review sites, etc. have also incorporated social networking features by which customers and users can interact with each other. In this regard, reference to the social networking service site 14 is also intended to encompass such online services.

Different services have features sets suitable for particular uses, though there are some features common to all. The details thereof as pertinent to the social network stealth and counter messaging will be described more fully below. It is envisioned that the methods and systems disclosed herein may be utilized in connection with other communications modalities including e-mail, simple message service (SMS), web-based group discussion forums, mobile group messaging applications, and so forth, and not limited to the foregoing social networking services or websites that incorporate certain social networking features. Thus, inclusion of the term social networking when referring to the social networking service site 14 and other features described herein are for purposes of convenience only and not of limitation. Such other communications modalities are understood to include corresponding features and perform corresponding functions as those attributed to social networking service site 14. Those having ordinary skill in the art will be able to recognize the modifications appropriate for these alternative communications modalities and implement similar message transformation methods and systems in such contexts.

The first user 16 operates a first client computer system 20 to access the Internet 12 and the websites connected thereto, including the social networking service site 14. By way of example only and not of limitation, the first client computer system 20 is a conventional desktop computer device including a central processing unit, memory, and various input and output devices such as keyboards, mice, and displays. The first client computer system 20 is connectible to the Internet 12 via a first Internet link 22. Although a conventional desktop computer device is shown, the first client computer system 20 may be a portable device such as a notebook computer, a tablet computer, a smart phone device, and the like that have data processing and communications capabilities.

Regardless of its form factor, the first client computer system 20 is understood to have executable instructions of a web browser application that is loaded thereon. The web browser application communicates with various web servers connected to the Internet 12 over the hypertext transfer protocol (HTTP), among other protocols known in the art as will be further detailed below. Requests for data are initiated by the first client computer system 20 and transmitted to the servers, while the requested server responds with a transmission of the requested data back to the first client computer system 20. The operational principles of web servers, web browser applications, and the Internet 12 are well understood, so no further details will be discussed herein. The present disclosure references the web browser application and the hypertext transfer protocol, but it will be appreciated that there may be some embodiments where such an application or protocol is not utilized. For example, there may be a dedicated social networking service application, or a secure alternative to HTTP such as HTTPS may be substituted. Accordingly, as referenced herein, the web browser application is understood encompass any other application that interacts with various servers connected to the Internet 12 to exchange data.

Generally, the social networking service site 14 is understood to facilitate interactive online communications between the user 16 and a network of contacts with which some linked relationship is established. The first user 16 is assigned an account 24 that includes a profile 26 with basic biographic information, as well as a content repository 28. It is understood that a variety of user-generated content may be posted to the content repository 28, including text messages, photographs, videos, event calendars, geographic locations in the form of GPS (Global Positioning System) coordinates, and links to other websites on the Internet 12. This feature may be variously referred to in the art as a "wall," a "stream," a "comment box," or the like. Regardless of the specific nomenclature, the function is essentially the same; the users of the social networking service site 14 are able to publish and share content therewith. Thus, as referenced herein, the term post or posting refers to the upload or storage of any data to the social networking service site 14.

In the example shown, the account 24 is linked to a contact B 30 and a contact C 33, and possibly others. The contact B 30 can correspond to a second account 32 that also includes a separate profile 34 and a content repository 36. Furthermore, the second account 32 may be assigned to the second user 18, which accesses the Internet 12 with a second client computer system 38. It is to be understood that like the first client computer system 20, the second client computer system 38 has a processor, memory, input and output components, and data communications modalities including a second Internet connection 40. A web browser software application loaded thereon may initiate data transfer requests over the Internet connection 40 with websites such as the social networking service site 14, and for most part, are the same as the desktop application counterparts running on the first client computer system 20 described above.

Some social networks enforce bi-directional contact linking, that is, to the extent the first account 24 is linked to the contact B 30 and the thus the second account 32, the second account 32 also has a link to contact A 31 corresponding to the first account 24. This is a feature of social networks such as Facebook and LinkedIn. Other social networks such as Twitter or Google+ utilize unidirectional contact linking, where there is a link established between the first account 24 and the contact B 30, but there is no reciprocal link back from the corresponding second account 32 to the contact A 30 unless a link is independently established.

In general, the social networking service site 14 facilitates the sharing of content stored in the respective repositories 28, 36 between the first account 24 (i.e., the first user 16), the second account 32 (i.e., the second user 18) and other linked accounts. With bi-directionally linked contacts, content that is posted by the first user 16 to the content repository 28 is visible to the second user 18 when logged in to the social networking service site 14, unless otherwise blocked according to specific user-adjustable privacy settings. Furthermore, the content repository 28 is receptive to posts from other users within the network of contacts of the first user 16, and is visible to the first user 16 as well as the second user 18 when logged in. With uni-directionally linked contacts, content that is posted by the first user 16 may not be visible to the second user 18 unless the corresponding second account 32 has established a specific link back to the contact A 31, or the first account 24.

The content in the content repository of a particular account can be generated on a page upon other users accessing the profile associated therewith. Alternatively, a main or home page may be generated upon login, with the content from the content repository of all contacts associated with the account are listed in chronological order, together with the name of each author. Besides these two common methods, there are other ways in which content may be displayed. The contemplated message transformation systems and methods may be utilized in connection with such other display methods, and deemed to be within the scope of the present disclosure.

In the context of the first user 16 and the second user 18 on the social networking service site 14, there may be some circumstances where the first user 16 desires to post certain content to the content repository 28 for viewing by the second user 18, but desires other users to see alternative content. For example, being close friends, the first user 16 may desire to announce to the second user 18 (possibly among others) that he is consuming copious volumes of intoxicating beverages, while simultaneously announcing to other contacts on the social networking service site 14 that he is studying at the library. In other words, the first user 16 may desire to post one announcement for a certain audience with those users being able to retrieve and view the actual or true message, while posting a different, false message for another audience. Accordingly, the false message may also be referred to as a counter-message, as in counter-intelligence, such that users viewing the counter-message are provided false, possibly misleading information. Along these lines, the true message may also be referred to as a stealth message since it is intended to be secret to the extent it is obfuscated by the counter-message. Besides text messages, similar treatment of other content such as links, event calendars, videos, GPS location data and so forth is also envisioned. The present disclosure refers to each such content as a "message," and thus this is understood to refer to any content that can be posted or otherwise associated with user accounts on the social networking service site 14.

Figure 2:
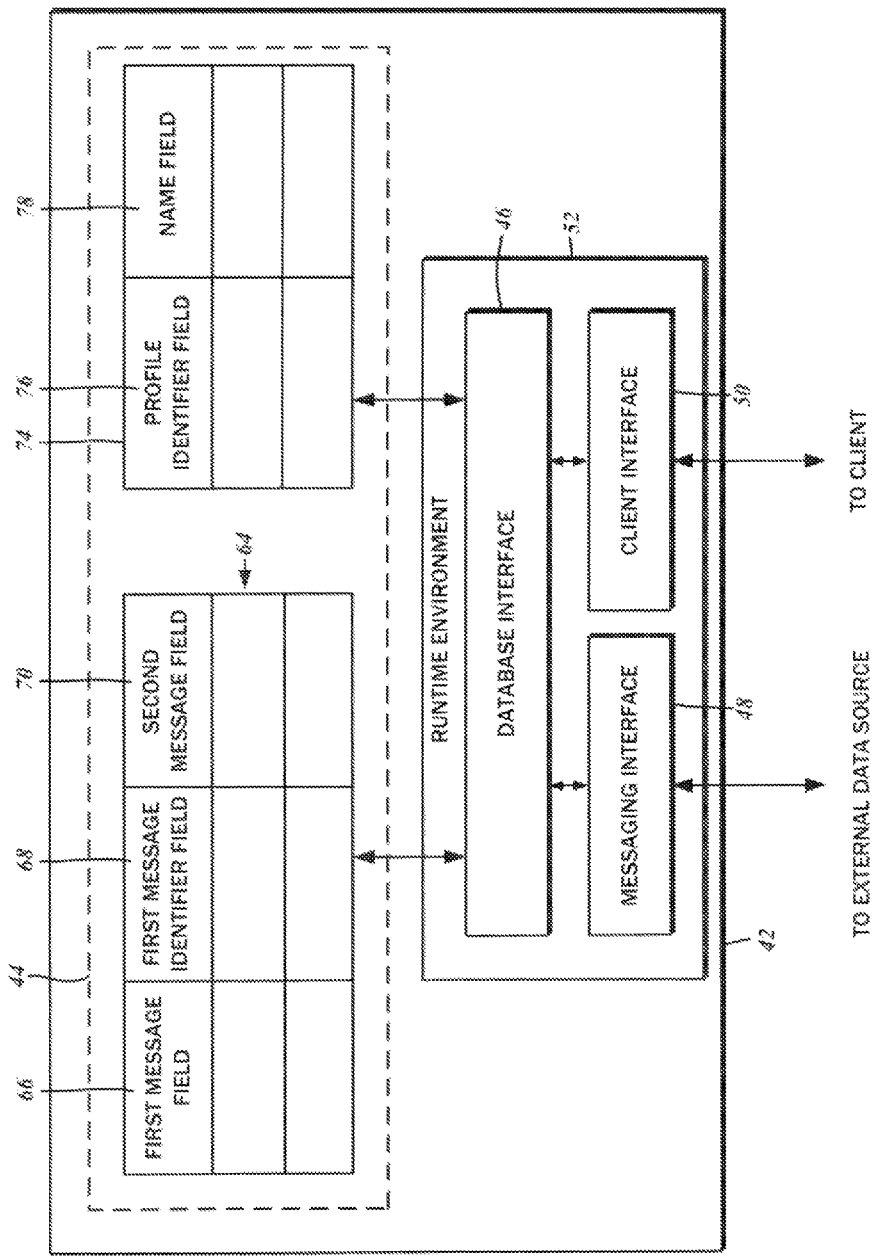
FIG. 2 is a block diagram of a system for transforming messages and its constituent components.

Various embodiments of the present disclosure contemplate methods for transforming messages for the social networking service site 14 in the general manner described above. As shown in FIG. 1, there is also a proxy messaging server 42 connected to the Internet 12 that interacts with the social networking service site 14 and the client computer systems 20, 38 to achieve this functionality. However, it is expressly contemplated that the functionality described herein as being performed by the proxy messaging server 42 may also be implemented directly on the social networking service site 14. Further details of the proxy messaging server 42 are shown in the block diagram of FIG. 2, including a database 44, and a database query interface 46 connected thereto. Other components include a messaging interface 48 that serves as the intermediary between the social networking service site 14 to the database query interface 46, as well as a client interface 50 that serves as the intermediary between the client computer systems 20, 38 and the database query interface 46. It will be appreciated that this is only one generalized example of the way in which the various functions of the proxy messaging server 42 can be implemented as logical software components, and is not intended to be limiting. Those having ordinary skill in the art will readily ascertain alternative components for performing similar or identical functions.

In one exemplary embodiment, the database 44, and more particularly the database query interface 46 is a relational database management system (RDBMS) that is queried with the Structured Query Language (SQL). Parts of the functionality associated with the database query interface 46, the messaging interface 48, and the client interface 50 may be embodied as instructions of software code running under a web application server or software framework and runtime environment 52 such as the Sun GlassFish system. Any other application server may be substituted, however. Notwithstanding the reference to a relational database system and associated commands and querying features, it will be recognized that any other database model may be utilized. For instance, a non-relational database known as Cassandra, which is based on the key/value model of storing data found in the Google BigTable database may also be utilized. Those having ordinary skill in the art will recognize the necessary modifications to implementation details in embodiments where such alternative components are employed. One example modification is the substitution of the Thrift or other RPC framework and accompanying query commands instead of SQL queries.

Figure 3:
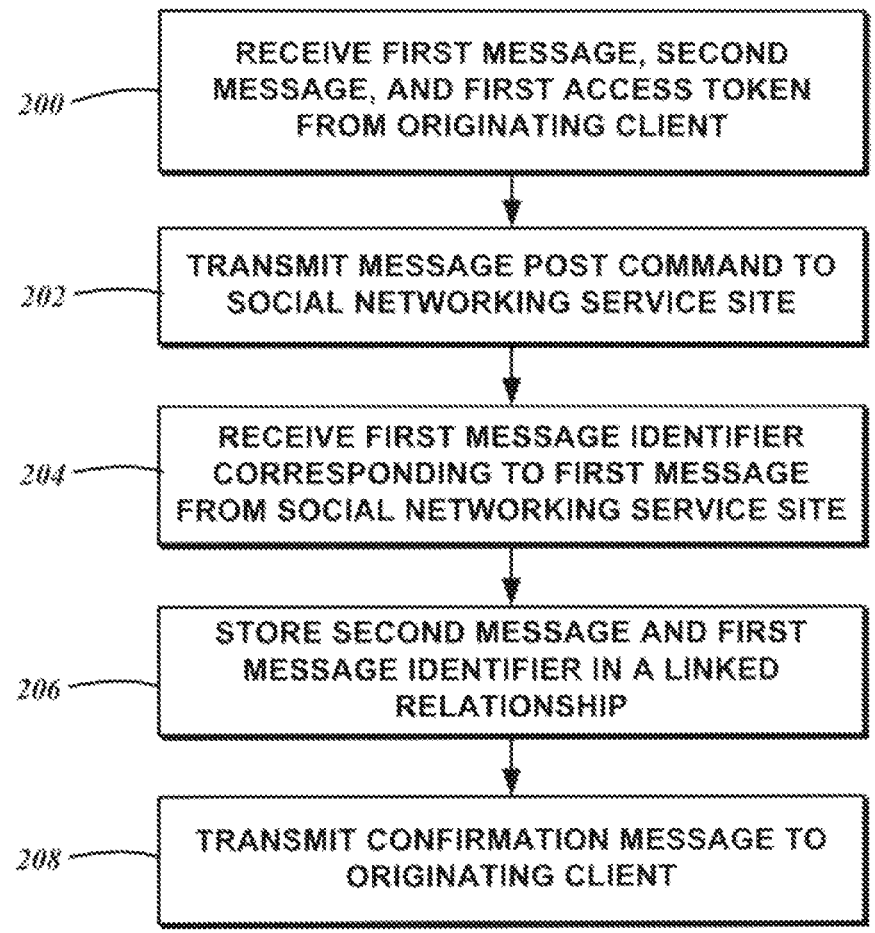
FIG. 3 is a flowchart showing a first embodiment of a method of transforming messages for a social networking site in which a proxy is utilized to post a message thereto.
Figure 4:
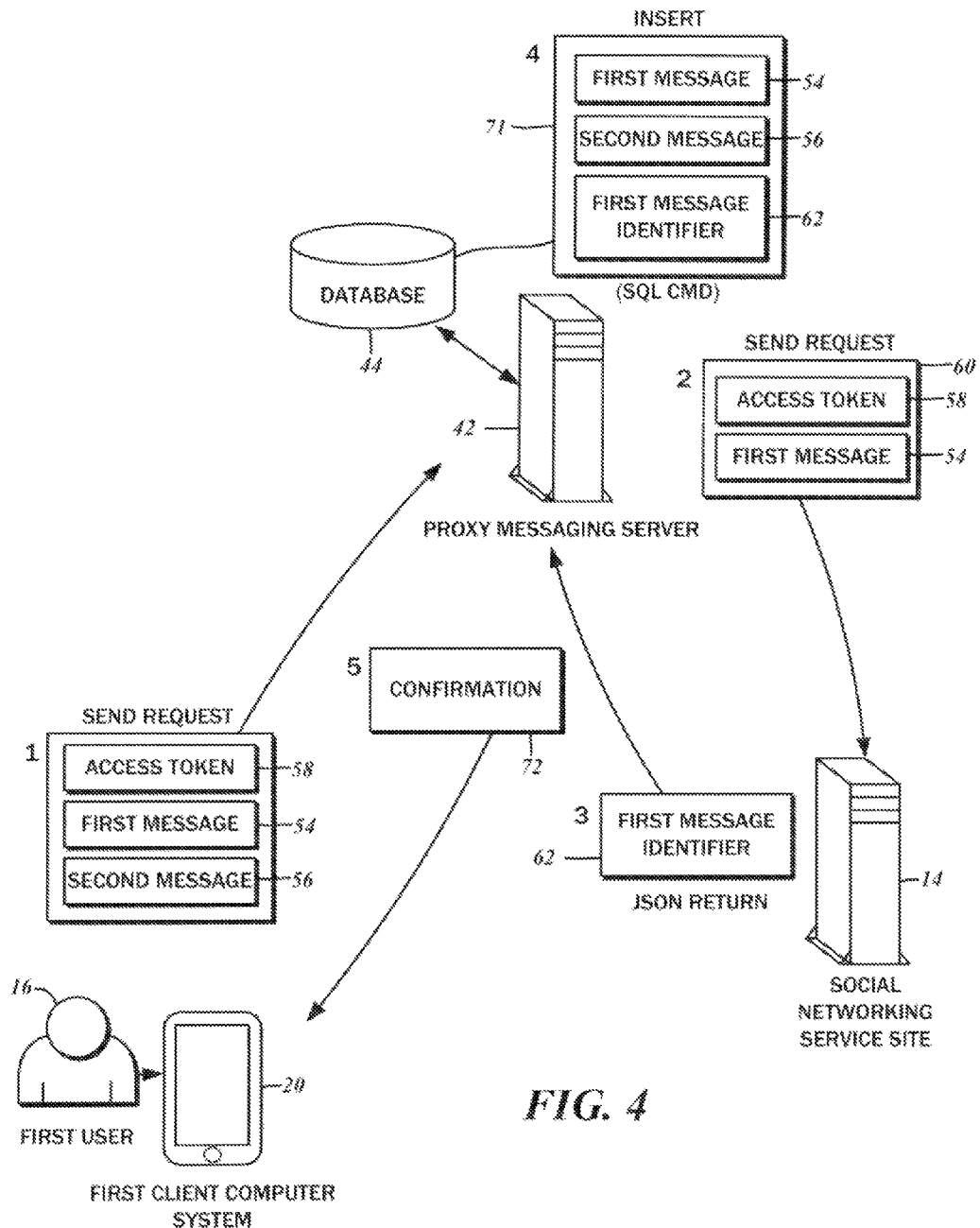
FIG. 4 is a data flow sequence block diagram showing the first embodiment of the method of transforming messages described in the flowchart of FIG. 3.

With reference to the flowchart of FIG. 3 and the data flow block diagram of FIG. 4, a first embodiment of a method for transforming messages from the perspective of the proxy messaging server 42, includes a step 200 of receiving from an originating client, i.e., the first client computer system 20, a first message 54, a second message 56 that is associated with the first message 54, and a first access token 58 that is specific to the first user 16 of the social networking service site 14. This aspect is understood to relate to the posting of messages to the content repository 28. The receiving step may be performed by the messaging interface 48 of the proxy messaging server 42 in some embodiments.

Since the first message 54 and the second message 56 are received from the first client computer system 20, it may also be referenced as an external data source to which the messaging interface 48 interconnects the database query interface 46. Along these lines, the social networking service site 14 may also be regarded as an external data source to which the messaging interface 48 interconnects the database query interface 46. The first message 54 is understood to be the false or counter-message that is to be posted to the content repository 28 of the first account 24, while the second message 56 is understood to be the "real" or stealth message that is only visible to a select few users that the first user 16 has designated such as the second user 18.

Prior to the step of receiving the aforementioned data from the originating client, in order to obtain the first access token 58, the first user 16 may first log in to the social networking service site 14 using a login name and a password. Upon login, a cookie or other browser artifact that includes the first access token 58 may be stored on the first client computer system 20. The first access token 58 may be subsequently extracted and retrieved for transmission to the proxy messaging server 42. Thus, the first access token 58 is also associated with the originating client. Alternatively, the first access token 58 may also be a session identifier, or some other authenticated identifier for permitting access. The first access token 58 may be generated by the social networking service site 14, the proxy messaging server 42, or extracted from another source by either the social networking service site 14 or the proxy messaging server 42. One embodiment envisions the use of a phone number associated with a cellular phone where the first client computer system 20 is such a device.

Thereafter, in step 202, the proxy messaging server 42 transmits a message post command 60 to the social networking service site 14. Accompanying the message post command 60 is the first message 54 and the first access token 58 so that the proper first account 24 and related content repository 28 to which the first message 54 is to be posted can be authenticated and verified. Effectively, the proxy messaging server 42 acts as an agent on behalf of the first client computer system 20 to communicate and upload data to the social networking service site 14. As referenced herein, the message post command 60 is understood to include any command destined for the social networking service site 14 in which data is transmitted and stored thereon. It is to be understood that the inclusion of the term post does not limit the message post command to HTTP POST or other commands, and any other suitable command for data storage on a remote site may be utilized.

Once the message post command 60 is performed by the social networking service site 14 by adding the first message 54 to the content repository 28 of the specified first account 24, the method includes a step 204 of receiving a first message identifier 62. It is understood that the first message identifier 62 uniquely identifies the posted first message 54 within all of the messages existing on the social networking service site 14, and is generated in response to a validation of the first access token 58 and a completed and confirmed posting of the first message 54. There are many ways in which the first message identifier 62 can be returned to the proxy messaging server 42, and the preferred, though optional way is structuring the data into a JavaScript Object Notation (JSON) interchange format.

Upon receiving the first message identifier 62, it is stored in the database 44 together with the first message 54 and the second message 56 in a linked relationship according to step 206. Referring again to FIG. 2, the database 44 is structured as multiple records 64 each with a first message field 66 for storing the first message 54, a first message identifier field 68 for storing the first message identifier 62, and a second message field 70 for storing the second message 56. The structure of the database 44 is presented by way of example only and not of limitation, as there may be some embodiments in which the first message 54 is discarded or otherwise not stored. It is understood that the database 44 is indexed with the first message identifier field 68, such that a query issued to the database query interface 46 with the first message identifier 62 retrieves the corresponding data in the second message field 70. As shown in FIG. 4, an SQL INSERT command 71 may be utilized to store the first message 54, the first message identifier 62, and the second message 56 in the database 44. In embodiments where the first message is not stored, the INSERT command 71 only includes the first message identifier 62 and the second message 56. Because the proxy messaging server 42, and specifically the messaging interface 48, is responsive to the first message identifier 62 and initiates the storing of the first message 54 and the second message 56, it may also be referred to as a message store request.

If the storing of the first message identifier 62, the second message 56, and optionally, the first message 54, is successful, the method continues with a step 208 of transmitting a confirmation message 72 to the first client computer system 20. Alternatively, the confirmation message 72 may be sent simply in response to receiving the first message identifier 62 from the social networking service site 14. The confirmation message 72 is also understood to be in the JSON interchange format, though any other suitable format may be substituted. The first client computer system 20 may handle the receipt of the confirmation message 72 in various ways, including rendering an indication that the process has completed.

Figure 5:
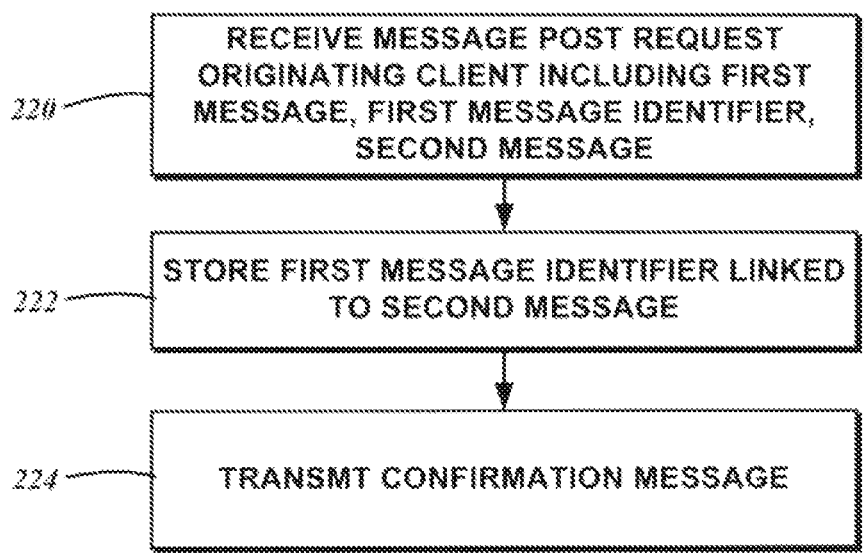
FIG. 5 is a flowchart showing a second embodiment of the method of transforming messages for the social networking site in which the message is posted directly thereto.
Figure 6:
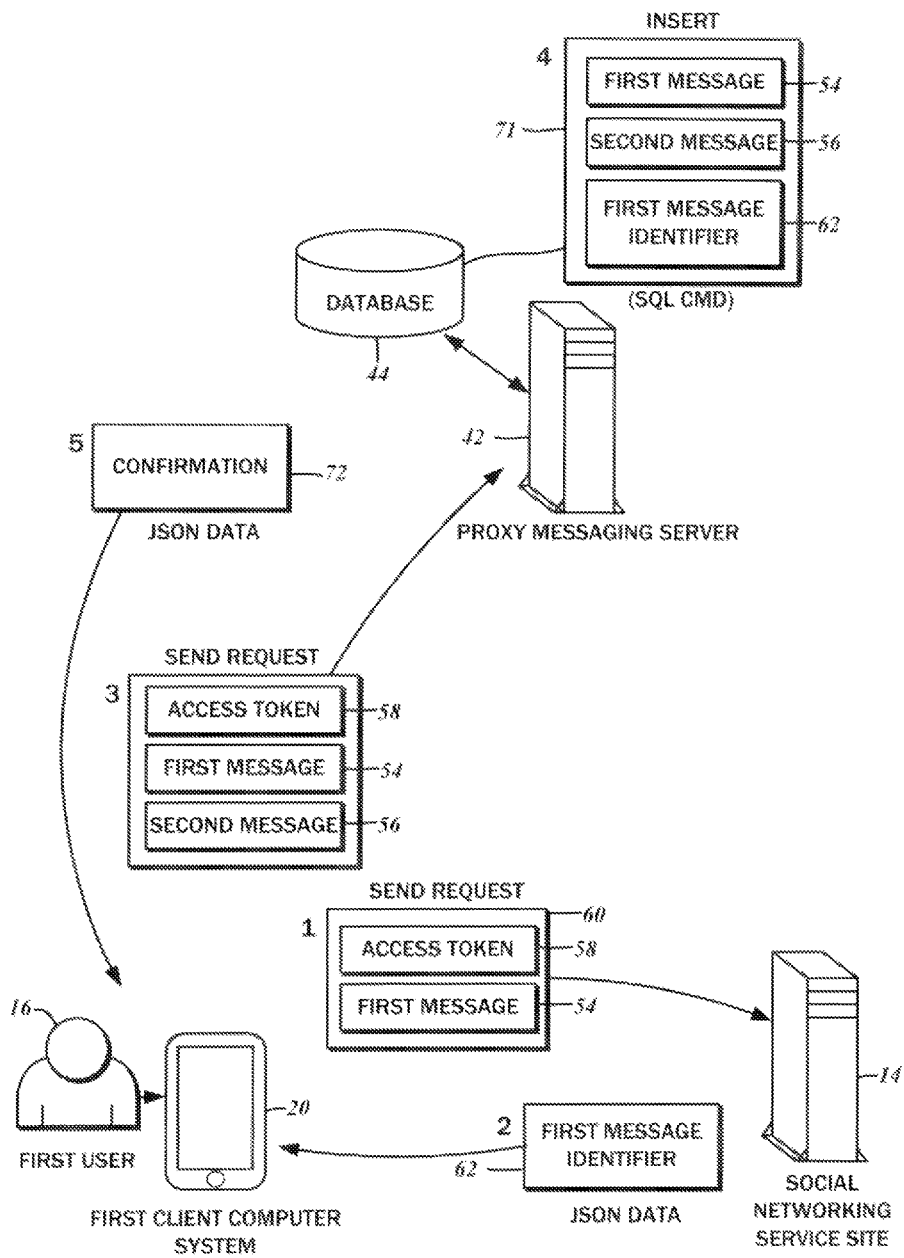
FIG. 6 is a data flow sequence block diagram showing the second embodiment of the method of transforming messages described in the flowchart of FIG. 5.

The flowchart of FIG. 5 and the data flow block diagram of FIG. 6 illustrate a second embodiment of the method for transforming messages from the perspective of the proxy messaging server 42. Again, this aspect relates to the posting of messages to the social networking service site 14. The method begins with a step 220 of receiving from the originating client, i.e., the first client computer system 20, the first message 54, the second message 56 that is associated with the first message 54, and the first message identifier 62.

Before involvement of the proxy messaging server 42, the first user 16 logs in to the first account 24 of the social networking service site 14 in the manner described above. A message post command 60 is also generated, but by the first client computer system 20. As with the above-described embodiment, the message post command 60 includes the first access token 58 retrieved by way of the login process, as well as the first message 54 entered by the first user 16. Upon successfully posting the first message 54 to the content repository 28, the social networking service site 14 returns the first message identifier 62 that corresponds thereto. Again, the first message identifier 62 is structured in accordance with the JSON interchange format, though this is by way of example only and not of limitation. It is understood that the first message identifier 62 itself is not it the JSON interchange format, though such data may be extracted from a collection of JSON-formatted data. The first message identifier 62 may be included in other data from the social networking service site 14, including the URL, or some other source. For embodiments of the present disclosure that utilize SMS as a communications modality or any others that do not allow the separation of data to a message and an identifier, the first message 54 may include the first message identifier 62 in-line together with an escape character or code. For example, the first message 54 and the first message identifier 62 may be combined thus: "!28 Hey, what's up?" In this example, the exclamation point is the escape character, with 28 being the first message identifier 62. The first message is "Hey, what's up?" Since the originating phone number is appended to SMS text messages, that can also partially serve as the first message identifier 62.

According to some embodiments, in a step 222, the first message identifier 62 is stored on the database 44 in a linked relationship to the second message 56. As will be described more fully below, the proxy messaging server 42 may only need to be involved with the retrieval and of the second message 56, since the false or counter-message of the first message 54 need not be displayed to the audience to which the second message 56 is directed. Optionally, the first message 54 is also stored in a linked relationship to the second message 56 and the first message identifier 62. The SQL INSERT command 71 may be utilized to store the foregoing data in the database 44.

Like the earlier described embodiment, if the storing of the second message 56, the first message identifier 62, and optionally the first message 54 is successful, the method continues with a step 224 of transmitting the confirmation message 72 to the first client computer system 20. The confirmation message 72 is understood to be in the JSON interchange format, though any other suitable format may be utilized for transferring this data.

The references herein to the first message and the second message are intended in the broadest sense, and may include various types of data besides text as briefly indicated above. Generally, regardless of the type, it is understood that the first message is different from the second message, as the first message 54 is meant for countering purposes, that is, for disseminating false information, while the second message 56 is hidden from everyone except authorized users. Similar to simple text messages, the first message 54 may include a Uniform Resource Locator (URL) link to an innocuous website, while the second message 56 may include a URL link to a potentially controversial, offensive, or otherwise inappropriate website for a select number of contacts linked to the user profile. Along these lines, alternative video footage may be stored separately in the first message field 66 and the second message field 70. Similar counter and stealth messages may be applicable to event invitations. In this case, the first message 54 may have time, date and descriptor data that is false, while the second message 56 may have different but accurate time, date, and descriptor data.

The concept is further applicable to location updates in the form of "check-ins" that are posted to the social networking service site 14. In one social networking service, a location is associated with a business or other physical facility. The address therefor is stored in a "page" representing that business or physical facility, and from the address a set of GPS coordinates may be derived. The first message 54 is envisioned to indicate the false location. First, input of GPS coordinates may be accomplished visually via online maps, with the location being graphically selected through the map interface. Upon selecting a general area and deriving a set of GPS coordinates therefrom, a list of pages for businesses and facilities close to the specified coordinates is generated. From the list, one page is selected for the purposes of "checking in" and stored as the first message 54. Since the page is also assigned a unique identifier, this may be stored as the first message identifier 62 if desired. A similar process is repeated for the actual location to be stored as the second message 56, except instead of receiving false GPS coordinates, GPS coordinates from an on-board GPS unit is substituted. Alternatively, location data in the form of GPS coordinates may also be retrieved from cellular phone towers. With some social networking services, additional data such as user-provided, text comments may also be linked to the check-in. Such data may also be incorporated into the respective first message 54, second message 56, and first message identifier 62.

Beyond the content being posted to the content repository 28, different versions of the names displayed next to posted content is likewise contemplated. Instead of the database 44 for storing the messages, there may be a separate table 74 with a profile identifier field 76 that stores the unique identifier for the account as defined by the social networking service site 14, and an associated with a name field 78 that stores the desired display name. The name field 78 associated with the profile identifier of the first account 24 would likely include the real name of the first user 16, with the biographic information and the display name taken therefrom indicating a false name. Further details regarding the steps involved in showing the display name and/or a false name will be described more fully below.

Figure 7:
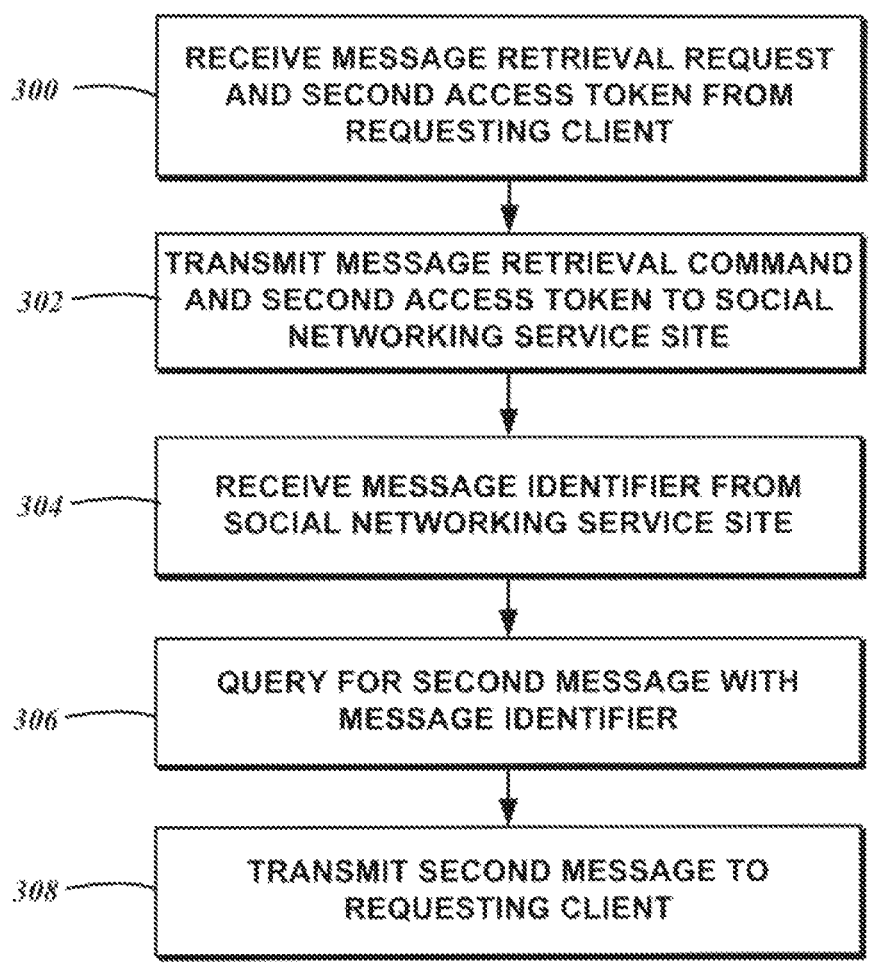
FIG. 7 is a flowchart showing a third embodiment of the method of transforming messages for the social networking site in which the proxy is used to retrieve a second message.
Figure 8:
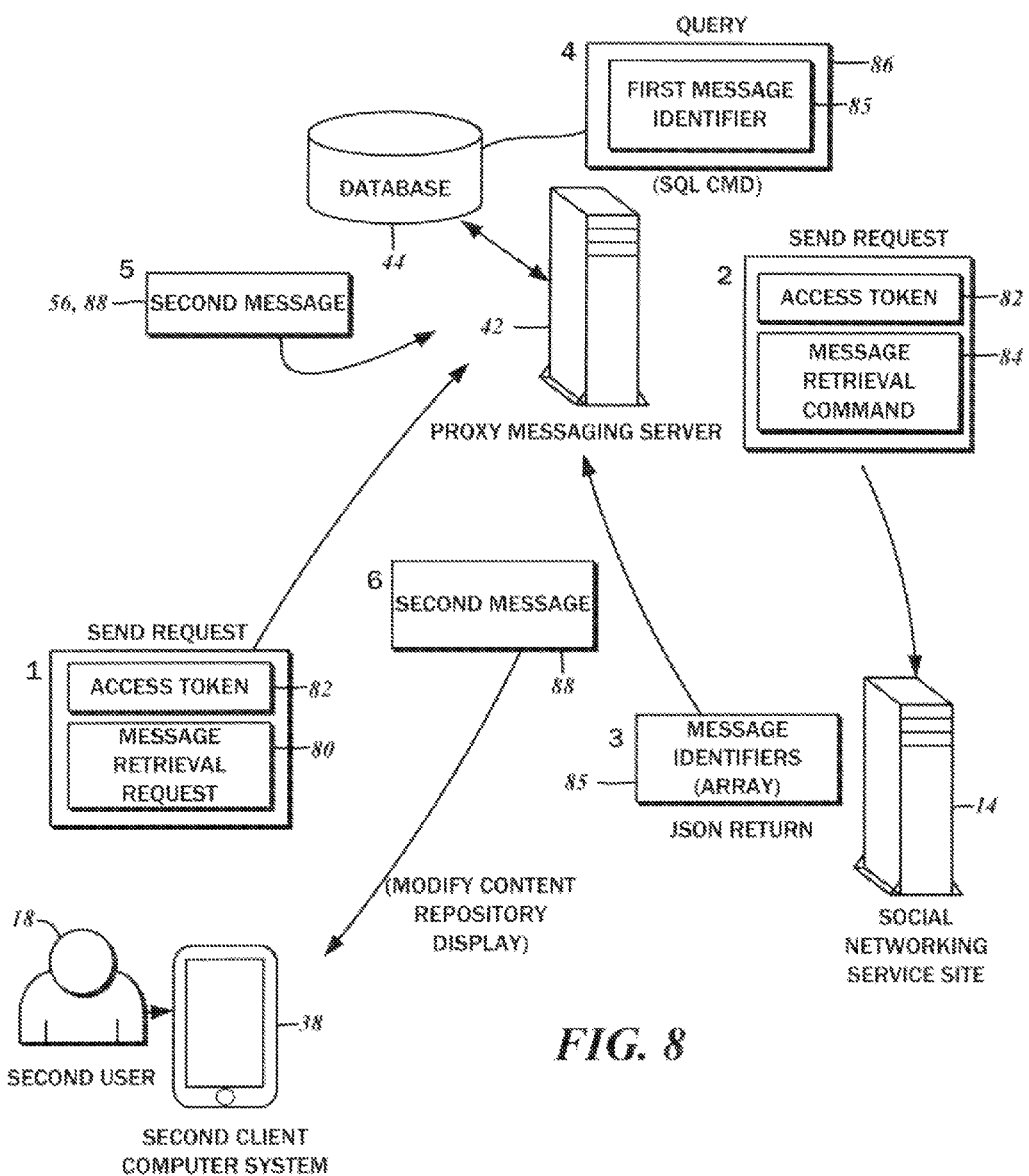
FIG. 8 is a data flow sequence block diagram showing the third embodiment of the method of transforming messages described in the flowchart of FIG. 7.

Having considered the features associated with the posting of messages to the social networking service site 14, the features for the retrieval of messages from the proxy messaging server 42 for display by the second client computer system 38 will now be considered. The flowchart of FIG. 7 and the data flow block diagram of FIG. 8 illustrate another, third embodiment of the method for transforming messages. The method includes a step 300 of receiving from a requesting client, i.e., the second client computer system 38, a message retrieval request 80 and a second access token 82. It is also contemplated, however, that the requesting client may also be the first client computer system 20 where the first user 16 is viewing content posted to his own content repository 28.

In some embodiments, the second access token 82 is understood to be specific to the second user 18 of the social networking service site 14 and associated with the second client computer system 38. The second access token 82 need not be limited thus, and may instead be generated and assigned by the proxy messaging server 42, with no requirement for the second user 18 to be logged in, or even have an account with the social networking service site 14 to view the posted content. Again, obtaining the second access token 82 may first involve the second user 18 logging in to the social networking service site 14 using a login name and a password. After a successful login, a cookie or other browser artifact that includes the second access token 82 may be stored on the second client computer system 38. The second access token 82 may be subsequently extracted and retrieved for transmission to the proxy messaging server 42. As indicated above in relation to the first access token 58, the second access token 82 may be a session identifier, or some other authenticated identifier for permitting access. Similarly, the second access token 58 may be generated by the social networking service site 14, the proxy messaging server 42, or extracted from another source by either the social networking service site 14 or the proxy messaging server 42.

The method continues with a step 302 of transmitting to the social networking service site 14 a message retrieval command 84 and the second access token 82. The message retrieval command 84 may be generated by the proxy messaging server 42 in response to the message retrieval request 80 from the requesting client. The social networking service site 14, in turn, provides the proxy messaging server 42 with the messages (or in some embodiments, the identifiers corresponding to those messages) that would otherwise be transmitted to the second client computer system 38 had a request been directly initiated from the same.

More particularly, the social networking service site 14 responds and generates an array of values 85, preferably in the JSON interchange format, of the message identifiers that correspond to the messages destined for the second client computer system 38. One of the message identifiers may be the first message identifier 62 discussed above, which references the first message 54, i.e., the false message. The message identifiers are received by the proxy messaging server 42, and specifically the messaging interface 48 thereof.

In step 306, using the received message identifier and via the database query interface 46, the database 44 is queried. If the query results in a match between the queried message identifier 86 and data in a first message identifier field 68 of the record in the database 44, then data in the associated second message field 70 is retrieved. For example, the query is for the first message identifier 62. The query will identify a record 64 with the same value, and then returns the corresponding second message 56 stored in the database 44 in accordance with step 206 or step 222 described above. There may be more than one received message identifier from the social networking service site 14, so the queries are repeated for each, finding and retrieving a corresponding second message if one exists in the database 44.

After completing the queries, the retrieved second messages 88, and in the above example, the second message 56, is transmitted to the requesting client, i.e., the second client computer system 38 per step 308. The client interface 50 of the proxy messaging server 42 is understood to provide this functionality. On the second client computer system 38, the received second messages 88 may be rendered on the browser application.

It is understood that the message identifiers received from the social networking service site 14 may not correspond to any record 64 in the database 44. These are understood to be messages visible to the second user 18 but were posted by other users besides the first user 16, or were not otherwise posted by the first user 16 to the content repository 28 in accordance with the method for transforming messages. The identifiers for these messages may also be transmitted to the second client computer system 38 together with the second message 56, so that a client-side application may subsequently retrieve those messages from the social networking service site 14. Alternatively, the proxy messaging server 42 may directly contact the social networking service site 14 to retrieve those messages, and transmit all of the messages, including the stealth messages retrieved from the database 44, to the second client computer system 38.

Figure 9:
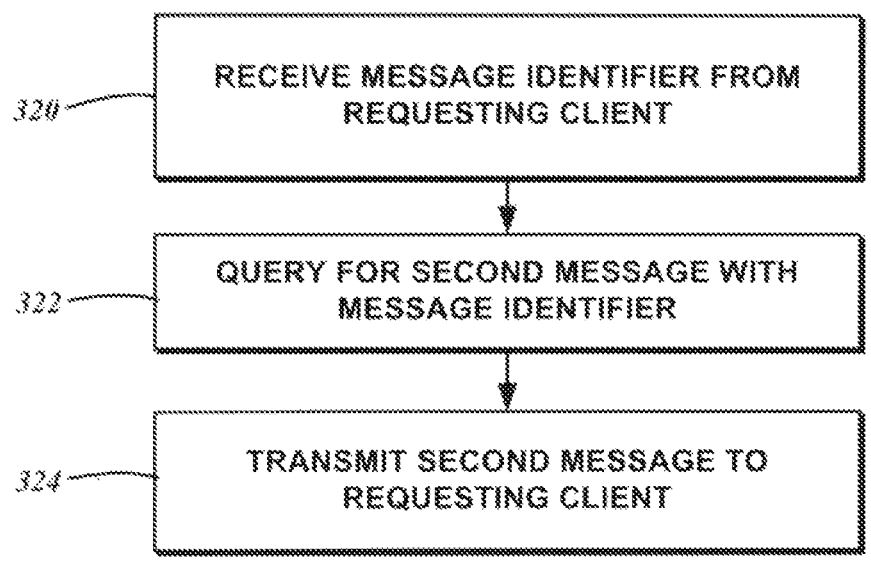
FIG. 9 is a flowchart showing a fourth embodiment of the method of transforming messages for the social networking site in which a client directly retrieves the second message.
Figure 10:
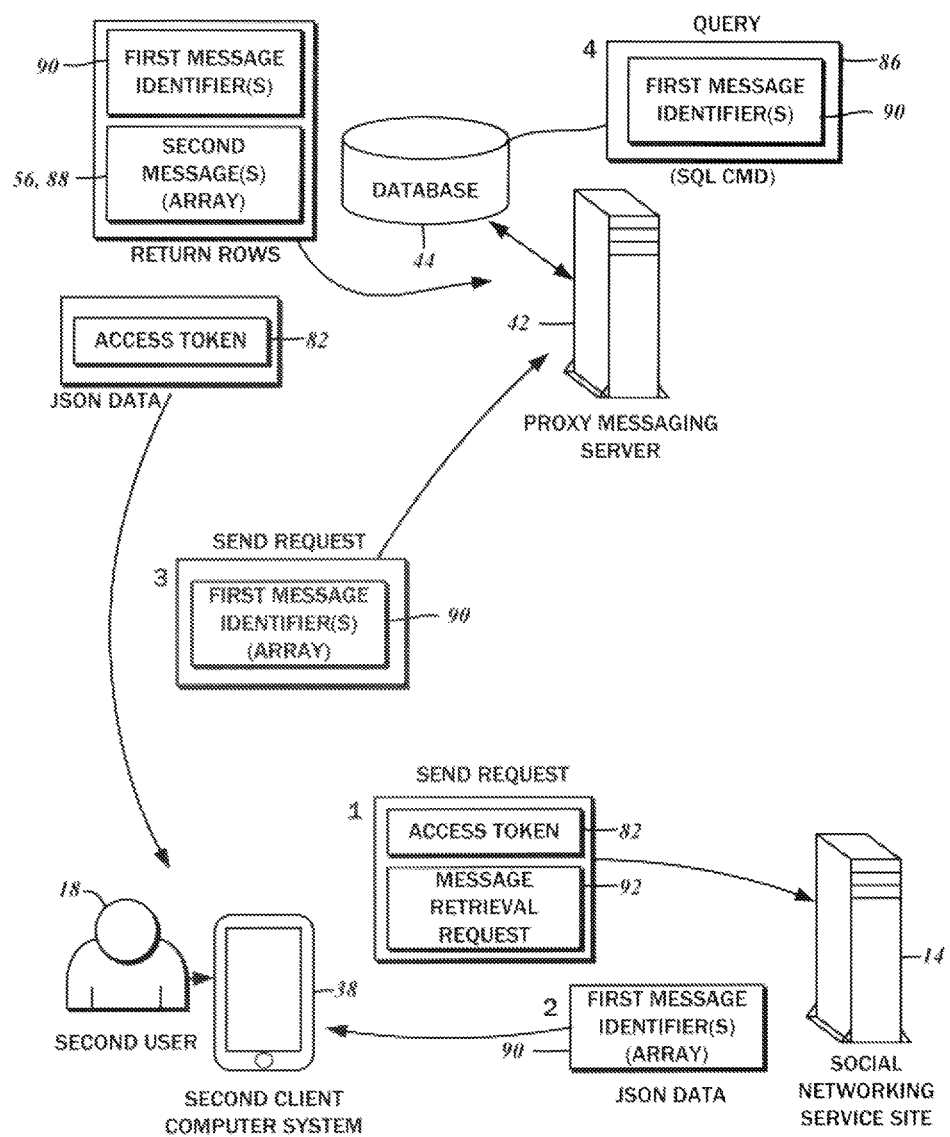
FIG. 10 is a data flow sequence block diagram showing the fourth embodiment of the method of transforming messages described in the flowchart of FIG. 9.

Another, fourth embodiment of the method for transforming messages relating to the retrieval of messages from the proxy messaging server 42 is contemplated. With reference to the flowchart of FIG. 9 and the data flow block diagram of FIG. 10, the method includes a step 320 of receiving from a requesting client, i.e., the second client computer system 38, a set of message identifiers 90.

In this embodiment, the second user 18 is understood to first log in to the second account 32 of the social networking service site 14. A message retrieval command 92 is issued to the social networking service site 14, and includes the second access token 82 retrieved through the login process. Thus, the user to which the request pertains, that is, the second user 18, and the messages that are designated for displaying thereto are identified. In response to the message retrieval command 92, the social networking service site 14 returns the set of message identifier 90.

According to step 322, using the received set of message identifiers 90 and via the database query interface 46, the database 44 is queried. If the query results in a match between the queried message identifier 86 and data in a first message identifier field 68 of the record in the database 44, then data in the associated second message field 70 is retrieved as discussed above in relation to the third embodiment. Likewise, there may be more than one received message identifier from the social networking service site 14, so the queries are repeated for each, finding and retrieving a corresponding second message if one exists in the database 44.

After completing the queries, the retrieved second messages 88, and in the above example, the second message 56, is transmitted to the requesting client, i.e., the second client computer system 38 according to step 324. On the second client computer system 38, the received second messages 88 may be rendered on the browser application. To the extent there were message identifiers in the set 90 that did not correspond to any records 64 in the database 44, the browser application is understood to display the corresponding messages as received from the social networking service site 14. To ensure that the correct posts and accounts are being subsequently accessed by the second client computer system 38, the proxy messaging server 42 may transmit the second access token 82 thereto.

With either of the embodiments involving the transmission of the second messages 88 to the requesting client, it is contemplated that the stealth messages and the other non-stealth messages that are to be displayed by the requesting client are retrieved and rendered on a page generated by the proxy messaging server 42.

The screen shot of FIG. 11 shows a first social networking service user interface 94, which is a rendered HTML page generated for the second user 18 who has access to the stealth, or actual messages posted by the first user 16. The user interface 94 may be rendered as tables, formatted text, or otherwise, depending on the specifics of the operating platform of the requesting client. In mobile devices, the respective Application Programming Interface (API) function may be utilized to display the content, such as UITableView for iPhones, TableLayout for Android-based devices, and TableView for Blackberry devices. A content posting section 96 lists, in chronological order, different messages that were shared with the second user 18. This includes the second message 56 that was retrieved from the proxy messaging server 42. Next to each listing, including the second message 56, there is a username 98 and a profile picture 100. As indicated above, a display name that is different from the name associated with the first account 24 and profile 26 may be shown.

In contrast, the screen shot of FIG. 12 shows a second social networking service user interface 102 that is generated for a different user who does not have access to the stealth, second message 56. Accordingly, the first message or the counter-message that may include false information is displayed in the content posting section 96. For what appears to be the same posting, the message body is different. Furthermore, a different public name 104 is displayed. This is understood to be the name associated with the first account 24 and profile 26 on the social networking service site 14.

Other posts from different users not utilizing the disclosed message transformation methods and systems are shown identically in both the first and second social networking service user interfaces 94, 102.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A method of transforming messages for a social networking service site, the method comprising:
    receiving from an originating client a first message, a second message associated therewith, and a first access token specific to a first user of the social networking service site associated with the originating client;
    transmitting a message post command to the social networking service site, the message post command including the first message and the first access token, the first message being stored in a content repository of a first profile linked to the first user for view by other users of the social networking service site;
    receiving from the social networking service site a first message identifier corresponding to the first message, the first message identifier being generated in response to the message post command and a validation of the first access token;
    storing the second message and the first message identifier in a linked relationship for retrieval based upon a query for the first message identifier; and
    transmitting a confirmation message to the originating client in response to receiving the first message identifier;
    receiving from a requesting client a message retrieval request and a second access token specific to a second user of the social networking service site associated with the requesting client;
    transmitting to the social networking service site a message retrieval command and the second access token in response to the message retrieval request from the requesting client;
    receiving at least one message identifier from the social networking service site, the at least one message identifier being the first message identifier and corresponding to the first message stored in the content repository of the first profile;
    querying for the second message with the received at least one message identifier; and
    transmitting to the requesting client the second message.

2. The method of claim 1, further comprising:
    transmitting to the requesting client a third message;
    wherein the third message is stored in a content repository of another profile and is received from the social networking service site concurrently with the at least one message identifier in response to the message retrieval command.

3. The method of claim 1, wherein:
    the first profile associated with the first user includes a primary username; and
    a user-specified secondary username associated with the first profile and different from the primary username is transmitted to the requesting client together with the second message.

4. The method of claim 1, wherein the first message and the second message include text inputted by the first user, the text in the first message being different from the text in the second message.

5. The method of claim 1, wherein the first message and the second message include location data, the location data of the first message corresponding to a first predetermined location different from a current location of the first user, and the location data of the second message corresponding to the current location of the first user.

6. The method of claim 1, wherein the first message and the second message include Uniform Resource Locator (URL) links, the URL link in the first message being different from the URL link in the second message.

7. The method of claim 1, wherein the first message and the second message include an event invitation with time, date, and descriptor data, the event invitation in the first message being different from the event invitation in the second message.

8. The method of claim 1, wherein the first message includes a first video footage and the second message includes a second video footage different from the first video footage.

9. A method of transforming messages for a social networking service site, the method comprising:
    receiving from an originating client a message post request including a first message posted to the social networking service site, a first message identifier corresponding to the first message, and a second message associated with the first message;
    storing the message identifier in a linked relationship to the second message;
    transmitting a confirmation message to the originating client following the storing of the message identifier;
    receiving from a requesting client a message retrieval request and a second access token specific to a second user of the social networking service site associated with the requesting client;
    transmitting to the social networking service site a message retrieval command and the second access token in response to the message retrieval request;
    receiving at least one message identifier from the social networking service site, the at least one message identifier being the first message identifier and corresponding to the first message stored in the content repository of the first profile;
    querying for the second message with the received at least one message identifier; and
    transmitting to the requesting client the second message;
    wherein the first message identifier is generated by the social networking service site in response to a message post command from the originating client including a first access token specific to a first user of the social networking service site associated with the originating client.

10. The method of claim 1, wherein the first message is stored in the content repository of a first profile linked to the first user for view by other users of the social networking service site.

11. The method of claim 10, further comprising:
    transmitting to the requesting client a third message;
    wherein the third message is stored in a content repository of another profile and is received from the social networking service site concurrently with the at least one message identifier in response to the message retrieval command.

12. The method of claim 1, wherein:
the first profile associated with the first user includes a primary username; and
a user-specified secondary username associated with the first profile and different from the primary username is transmitted to the requesting client together with the second message.

13. The method of claim 1, further comprising:
receiving from a requesting client at least one message identifier designated for access by a second user of the social networking service site associated with the requesting client, the at least one message identifier being the first message identifier and corresponding to the first message stored in the content repository of the first profile;
querying for the second message with the at least one message identifier; and
transmitting to the requesting client the second message.

14. The method of claim 13, wherein:
the first profile associated with the first user includes a primary username; and
a user-specified secondary username associated with the first profile and different from the primary username is transmitted to the requesting client together with the second message.

15. The method of claim 1, wherein the first message and the second message include text inputted by the first user, the text in the first message being different from the text in the second message.

16. The method of claim 9, wherein the first message and the second message include location data, the location data of the first message corresponding to a first predetermined location different from a current location of the first user, and the location data of the second message corresponding to the current location of the first user.

17. The method of claim 9, wherein the first message and the second message include Uniform Resource Locator (URL) links, the URL link in the first message being different from the URL link in the second message.

18. The method of claim 9, wherein the first message and the second message include an event invitation with time, date, and descriptor data, the event invitation in the first message being different from the event invitation in the second message.

19. The method of claim 9, wherein the first message includes a first video footage and the second message includes a second video footage different from the first video footage.

20. A method of transforming messages for a social networking service site, the method comprising:
receiving from an originating client a first message, a second message associated therewith, and a first access token specific to a first user of the social networking service site associated with the originating client;
transmitting a message post command to the social networking service site, the message post command including the first message and the first access token, the first message being stored in a content repository of a first profile linked to the first user for view by other users of the social networking service site;
receiving from the social networking service site a first message identifier corresponding to the first message, the first message identifier being generated in response to the message post command and a validation of the first access token;
storing the second message and the first message identifier in a linked relationship for retrieval based upon a query for the first message identifier;
transmitting a confirmation message to the originating client in response to receiving the first message identifier; and
receiving from a requesting client at least one message identifier designated for access by a second user of the social networking service site associated with the requesting client, the at least one message identifier being the first message identifier and corresponding to the first message stored in the content repository of the first profile.

21. The method of claim 20, wherein:
the first profile associated with the first user includes a primary username; and
a user-specified secondary username associated with the first profile and different from the primary username is transmitted to the requesting client together with the second message.

22. The method of claim 20, wherein the first message and the second message include text inputted by the first user, the text in the first message being different from the text in the second message.

23. The method of claim 20, wherein the first message and the second message include location data, the location data of the first message corresponding to a first predetermined location different from a current location of the first user, and the location data of the second message corresponding to the current location of the first user.

24. The method of claim 20, wherein the first message and the second message include Uniform Resource Locator (URL) links, the URL link in the first message being different from the URL link in the second message.

25. The method of claim 20, wherein the first message and the second message include an event invitation with time, date, and descriptor data, the event invitation in the first message being different from the event invitation in the second message.

26. The method of claim 20, wherein the first message includes a first video footage and the second message includes a second video footage different from the first video footage.

* * * * *